US012807455B2

(12) United States Patent
Kokkala et al.

(10) Patent No.: US 12,807,455 B2
(45) Date of Patent: Nov. 24, 2026

(54) ELEVATOR CALL ALLOCATION

(71) Applicant: KONE Corporation, Helsinki (FI)

(72) Inventors: Juho Kokkala, Helsinki (FI); Mirko Ruokokoski, Helsinki (FI); Juha-Matti Kuusinen, Helsinki (FI); Janne Sorsa, Helsinki (FI); Kimmo Berg, Helsinki (FI); Sami Haaranen, Helsinki (FI)

(73) Assignee: KONE Corporation, Helsinki (FI)

( * ) Notice: Subject to any disclaimer, the term of this patent is extended or adjusted under 35 U.S.C. 154(b) by 1372 days.

(21) Appl. No.: 17/534,912

(22) Filed: Nov. 24, 2021

(65) Prior Publication Data

US 2022/0081252 A1 Mar. 17, 2022

Related U.S. Application Data

(63) Continuation of application No. PCT/FI2019/050556, filed on Jul. 19, 2019.

(51) Int. Cl.
*B66B 1/24* (2006.01)
*B66B 1/46* (2006.01)

(52) U.S. Cl.
CPC ............ *B66B 1/2458* (2013.01); *B66B 1/468* (2013.01); *B66B 2201/211* (2013.01);
(Continued)

(58) Field of Classification Search
CPC ......... B66B 2201/211; B66B 2201/212; B66B 2201/214; B66B 2201/215;
(Continued)

(56) References Cited

U.S. PATENT DOCUMENTS 5,022,497 A * 6/1991 Thanagavelu ........ B66B 1/2458 187/382
6,257,373 B1 * 7/2001 Hikita .................. B66B 1/2458 187/387
(Continued)

FOREIGN PATENT DOCUMENTS

CN 1492829 A 4/2004
CN 101472822 A * 7/2009 ........... B66B 1/2458
(Continued)

OTHER PUBLICATIONS

International Search Report (PCT/ISA/210) issued in PCT/FI2019/050556 mailed on Apr. 23, 2020.
(Continued)

*Primary Examiner* — Shawki S Ismail
(74) *Attorney, Agent, or Firm* — Birch, Stewart, Kolasch & Birch, LLP

(57) ABSTRACT

A method for elevator call allocations in an elevator group of an elevator system includes applying statistical traffic forecasts modelling future passenger arrivals in the elevator system; receiving an indication of at least one elevator call; generating, for a fixed parameter, a set of scenarios based on the statistical traffic forecasts; determining a quality attribute for each candidate allocation policy of a set of candidate allocation policies by simulating, for each candidate allocation policy, the set of scenarios according to the candidate allocation policy in a current elevator call allocation situation in the elevator system; selecting a candidate allocation policy based on the quality attributes associated with the candidate allocation policies; and allocating the at least one elevator call to at least one elevator in the elevator group according to the selected candidate allocation policy.

17 Claims, 4 Drawing Sheets

(52) U.S. Cl.
CPC ... *B66B 2201/212* (2013.01); *B66B 2201/214* (2013.01); *B66B 2201/215* (2013.01); *B66B 2201/216* (2013.01); *B66B 2201/235* (2013.01); *B66B 2201/402* (2013.01); *B66B 2201/404* (2013.01)

(58) Field of Classification Search
CPC ........ B66B 2201/216; B66B 2201/235; B66B 2201/402; B66B 2201/404; B66B 2201/20; B66B 1/18
See application file for complete search history.

(56) References Cited

U.S. PATENT DOCUMENTS

| | | | | |
|---|---|---|---|---|
| 6,345,697 | B1 * | 2/2002 | Siikonen | B66B 1/2458 187/382 |
| 2005/0217946 | A1 | 10/2005 | Siikonen et al. | |
| 2010/0300814 | A1 * | 12/2010 | Eto | B66B 3/00 187/247 |
| 2017/0073186 | A1 * | 3/2017 | Parviainen | H04W 4/80 |
| 2018/0093853 | A1 * | 4/2018 | Kuusinen | B66B 1/2408 |

FOREIGN PATENT DOCUMENTS

| | | | | |
|---|---|---|---|---|
| CN | 110027946 | A * | 7/2019 | B66B 5/0018 |
| GB | 2240641 | A * | 8/1991 | B66B 1/18 |
| GB | 2 288 675 | A | 10/1995 | |
| WO | WO 02/066356 | A2 | 8/2002 | |

OTHER PUBLICATIONS

Written Opinion (PCT/ISA/237) issued in PCT/FI2019/050556 mailed on Apr. 23, 2020.

* cited by examiner

ELEVATOR CALL ALLOCATION

CROSS REFERENCE TO RELATED APPLICATIONS

This application is a Continuation of PCT International Application No. PCT/FI2019/050556, filed on Jul. 19, 2019, which is hereby expressly incorporated by reference into the present application.

BACKGROUND

In elevator group control, allocation decisions need to be made in real-time, with the information that exists at the time of making the decision. If an allocation decision is made shortsightedly considering only the already existing calls (i.e. elevator calls that have already been registered to a set of elevators), subsequent passenger arrivals may render the original decisions suboptimal. This may be problematic, for example, in immediate allocation where allocation decisions already made cannot be changed. The group control should thus take into account knowledge about possible future passenger arrivals when allocating new calls.

Thus, it would be beneficial to have a solution that would alleviate at least one of these drawbacks.

SUMMARY

An example embodiment of a method for elevator call allocations in an elevator group of an elevator system comprises applying statistical traffic forecasts modelling future passenger arrivals in the elevator system; receiving an indication of at least one elevator call; generating, for a fixed parameter, a set of scenarios based on the statistical traffic forecasts; determining a quality attribute for each candidate allocation policy of a set of candidate allocation policies by simulating, for each candidate allocation policy, the set of scenarios according to the candidate allocation policy in a current elevator call allocation situation in the elevator system; selecting a candidate allocation policy based on the quality attributes associated with the candidate allocation policies; and allocating the at least one elevator call to at least one elevator in the elevator group according to the selected candidate allocation policy.

In an example embodiment, alternatively or in addition to the above-described example embodiments, the method comprising determining, based on the simulating, for each candidate allocation policy an intermediate quality factor for each scenario of the set of scenarios in the current elevator call allocation situation in the elevator system; and the determining the quality attribute comprises determining the quality attribute for each candidate allocation policy of the set of candidate allocation policies based on the intermediate quality factors associated with each candidate allocation policy.

In an example embodiment, alternatively or in addition to the above-described example embodiments, the intermediate quality factor comprises at least one of an average waiting time, a sum of waiting times, an average time to destination, a sum of times to destination, an energy consumption, a waiting time and time to destination of each passenger, or a proportion of long waiting times.

In an example embodiment, alternatively or in addition to the above-described example embodiments, the quality attribute for each candidate allocation policy comprises an average value, an average of a non-linear utility function, a combination of mean and variance of the intermediate quality factor, a combination of means and variances of the intermediate quality factor, or a percentile of the intermediate quality factors.

In an example embodiment, alternatively or in addition to the above-described example embodiments, generating, for the fixed parameter, the set of scenarios comprises generating the set of scenarios by randomly sampling the statistical traffic forecasts.

In an example embodiment, alternatively or in addition to the above-described example embodiments, a passenger arrival comprises an arrival timestamp, an origin floor, a destination floor and a passenger batch size.

In an example embodiment, alternatively or in addition to the above-described example embodiments, the candidate allocation policy comprises at least one of the following: allocation of calls from a specific floor at a specific time interval to a specific elevator; allocation of calls to elevators depending on the order in which the calls arrive; and change of an elevator associated to a floor.

In an example embodiment, alternatively or in addition to the above-described example embodiments, the elevator system is a destination control system applying immediate call allocation.

In an example embodiment, alternatively or in addition to the above-described example embodiments, the fixed parameter comprises a fixed period of time or a fixed number of passenger arrivals.

An example embodiment of an apparatus for elevator call allocations in an elevator group of an elevator system, comprises means for applying statistical traffic forecasts modelling future passenger arrivals in the elevator system; means for receiving an indication of at least one elevator call; means for generating, for a fixed parameter, a set of scenarios based on the statistical traffic forecasts; means for determining a quality attribute for each candidate allocation policy of a set of candidate allocation policies by simulating, for each candidate allocation policy, the set of scenarios according to the candidate allocation policy in a current elevator call allocation situation in the elevator system; means for selecting a candidate allocation policy based on the quality attributes associated with the candidate allocation policies; and means for allocating the at least one elevator call to at least one elevator in the elevator group according to the selected candidate allocation policy.

In an example embodiment, alternatively or in addition to the above-described example embodiments, further comprising means for determining, based on the simulating, for each candidate allocation policy an intermediate quality factor for each scenario of the set of scenarios in the current elevator call allocation situation in the elevator system; and means for determining the quality attribute comprises determining the quality attribute for each candidate allocation policy of the set of candidate allocation policies based on the intermediate quality factors associated with each candidate allocation policy.

In an example embodiment, alternatively or in addition to the above-described example embodiments, the intermediate quality factor comprises at least one of an average waiting time, a sum of waiting times, an average time to destination, a sum of times to destination, an energy consumption, a waiting time and a time to destination of each passenger, or a proportion of long waiting times.

In an example embodiment, alternatively or in addition to the above-described example embodiments, the quality attribute for each candidate allocation policy comprises an average value, an average of a non-linear utility function, a combination of mean and variance of the intermediate quality factor, a combination of means and variances of the intermediate quality factor, or a percentile of the intermediate quality factors.

In an example embodiment, alternatively or in addition to the above-described example embodiments, generating, for the fixed parameter, the set of scenarios comprises generating the set of scenarios by randomly sampling the statistical traffic forecasts.

In an example embodiment, alternatively or in addition to the above-described example embodiments, a passenger arrival comprises an arrival timestamp, an origin floor, a destination floor and a passenger batch size.

In an example embodiment, alternatively or in addition to the above-described example embodiments, the candidate allocation policy comprises at least one of the following: allocation of calls from a specific floor at a specific time interval to a specific elevator; change of the candidate allocation policy as a function of time; allocation of calls to elevators depending on the order in which the calls arrive; and change of an elevator associated to a floor.

In an example embodiment, alternatively or in addition to the above-described example embodiments, the elevator system is a destination control system applying immediate call allocation.

In an example embodiment, alternatively or in addition to the above-described example embodiments, the fixed parameter comprises a fixed period of time or a fixed number of passenger arrivals.

An example embodiment of an elevator system comprises the apparatus discussed above in one or more of the above-described example embodiments.

An example embodiment of a computer program comprises instructions which, when the program is executed by a computer, cause the computer to carry out the method discussed above in one or more of the above-described example embodiments.

An example embodiment of a computer-readable medium comprising instructions which, when the program is executed by a computer, cause the computer to carry out the method discussed above in one or more of the above-described example embodiments.

An example embodiment of an apparatus for elevator call allocations in an elevator group of an elevator system, comprises at least one processor and at least one memory including computer program code. The at least one memory and the computer program code are configured to, with the at least one processor, cause the apparatus to at least perform: applying statistical traffic forecasts modelling future passenger arrivals in the elevator system; receiving an indication of at least one elevator call; generating, for a fixed parameter, a set of scenarios based on the statistical traffic forecasts; determining a quality attribute for each candidate allocation policy of a set of candidate allocation policies by simulating, for each candidate allocation policy, the set of scenarios according to the candidate allocation policy in a current elevator call allocation situation in the elevator system; selecting a candidate allocation policy based on the quality attributes associated with the candidate allocation policies; and allocating the at least one elevator call to at least one elevator in the elevator group according to the selected candidate allocation policy.

In an example embodiment, alternatively or in addition to the above-described example embodiments, the at least one memory and the computer program code are configured to, with the at least one processor, cause the apparatus to at least perform determining, based on the simulating, for each candidate allocation policy an intermediate quality factor for each scenario of the set of scenarios in the current elevator call allocation situation in the elevator system; and determining the quality attribute comprises determining the quality attribute for each candidate allocation policy of the set of candidate allocation policies based on the intermediate quality factors associated with each candidate allocation policy.

In an example embodiment, alternatively or in addition to the above-described example embodiments, the intermediate quality factor comprises at least one of an average waiting time, a sum of waiting times, an average time to destination, a sum of times to destination, an energy consumption, a waiting time and time to destination of each passenger, or a proportion of long waiting times.

In an example embodiment, alternatively or in addition to the above-described example embodiments, the quality attribute for each candidate allocation policy comprises an average value, an average of a non-linear utility function, a combination of mean and variance of the intermediate quality factor, a combination of means and variances of the intermediate quality factor, or a percentile of the intermediate quality factors.

In an example embodiment, alternatively or in addition to the above-described example embodiments, generating, for the fixed parameter, the set of scenarios comprises generating the set of scenarios by randomly sampling the statistical traffic forecasts.

In an example embodiment, alternatively or in addition to the above-described example embodiments, a passenger arrival comprises an arrival timestamp, an origin floor, a destination floor and a passenger batch size.

In an example embodiment, alternatively or in addition to the above-described example embodiments, the candidate allocation policy comprises at least one of the following: allocation of calls from a specific floor at a specific time interval to a specific elevator; change of the candidate allocation policy as a function of time; allocation of calls to elevators depending on the order in which the calls arrive; and change of an elevator associated to a floor.

In an example embodiment, alternatively or in addition to the above-described example embodiments, the elevator system is a destination control system applying immediate call allocation.

BRIEF DESCRIPTION OF THE DRAWINGS

The accompanying drawings, which are included to provide a further understanding and constitute a part of this specification, illustrate example embodiments and together with the description help to explain the principles. In the drawings.

DETAILED DESCRIPTION

Figure 1:
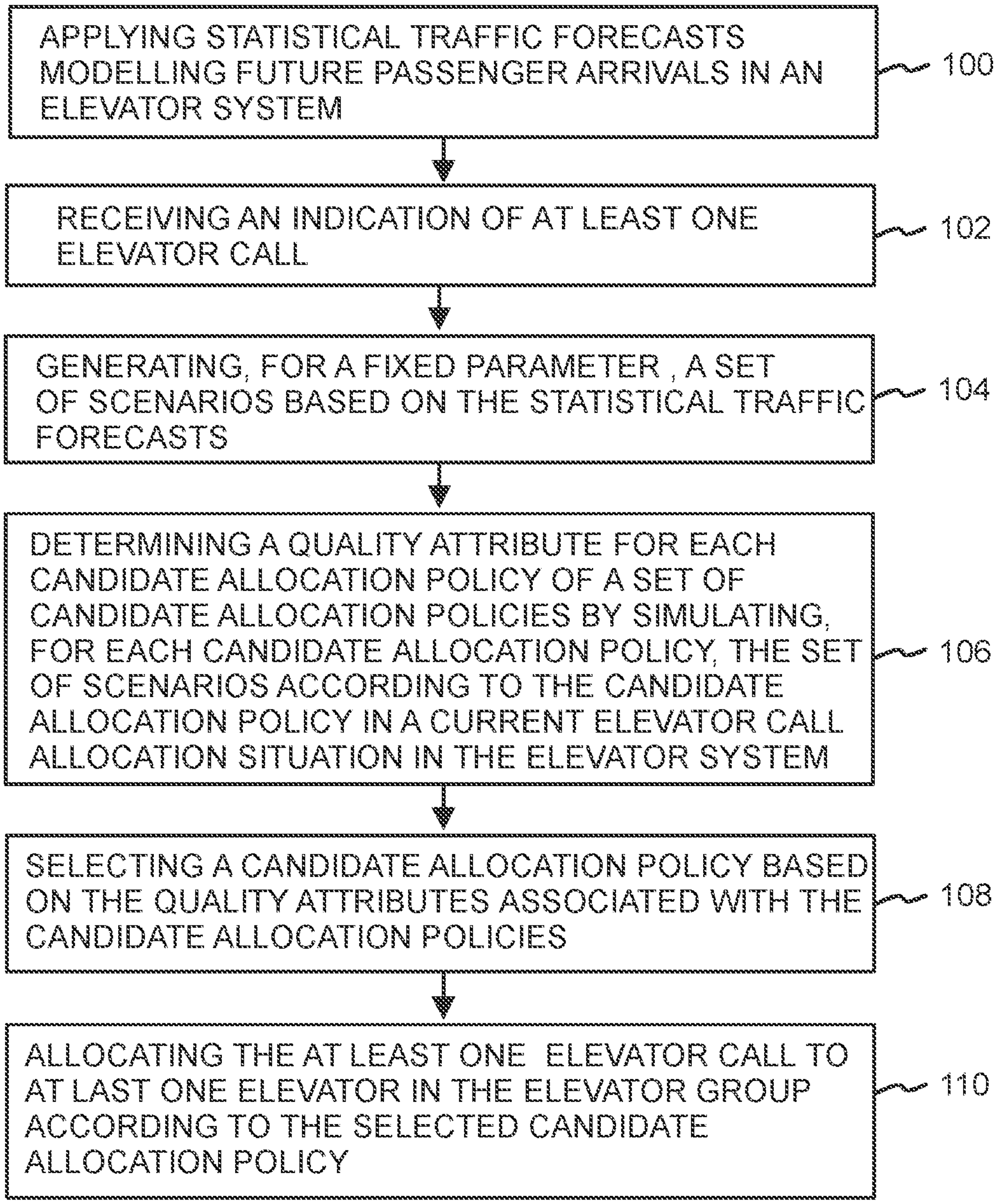
FIG. 1 illustrates a flow chart of a method for elevator call allocations in an elevator group of an elevator system according to an example embodiment.

FIG. 1 illustrates a flow chart of a method for elevator call allocations in an elevator group of an elevator system according to an example embodiment.

At 100, a statistical traffic forecasts modelling future passenger arrivals is applied in an elevator system. In an example embodiment, the statistical traffic forecasts may be defined for passenger arrivals such that the realizations of the process are, for example, lists of tuples of a form (arrival timestamp, origin floor, destination floor, passenger batch size). For example, for each origin-destination pair a geometric Poisson process may be used where arrivals follow a Poisson process and the batch sizes have a geometric distribution. The parameters of the processes may be obtained, for example, from historical statistics and recent observations. Alternatively or in addition, the statistical traffic forecasts may take into account sensor information about passengers likely to give calls in near future. In an example embodiment, the statistical traffic forecasts comprises a stochastic process model. In another example embodiment, historical realized calls may be used to model the future passenger arrivals in the elevator system.

At 102, an indication of at least one elevator call is received. The indication may be caused, for example, when one or more passengers make one or more elevator calls using, for example, up/down button or a destination operating panel (DOP). When continuous call allocation is used, the indication may refer also to another trigger other than the elevator call. In an example embodiment, this indication may be received at a specific interval, for example, of 0.5 s.

At 104, a set of scenarios is generated based on the statistical traffic forecasts for a fixed parameter. In an example embodiment, the fixed parameter may comprise a fixed period of time or a fixed number of passenger arrivals. Further, in an example embodiment, the set of scenarios may be generated by randomly sampling the statistical traffic forecasts from the current point onwards. This may include all uncertain information, for example, also the batch sizes of existing elevator calls that have not yet been served, for the fixed parameter (for example, two minutes). It is evident that two minutes in only one possible example for the fixed period of time, and it may take also other values. The number of the scenarios in the set of scenarios may take any appropriate number, for example, 1, 5, 20, 45 or any number between, for example, 5-100 etc. In another example embodiment, the set of scenarios may be generated based on historical realized calls. As an example, the historical realized calls may directly be used as the set of scenarios.

At 106 a quality attribute is determined for each candidate allocation policy of a set of candidate allocation policies by simulating, for each candidate allocation policy, the set of scenarios according to the candidate allocation policy in a current elevator call allocation situation in the elevator system. A candidate allocation policy may determine a specific way how elevator calls would be allocated. The quality attribute may refer, for example, to an average value, an average of a non-linear utility function, a combination of mean and variance of the intermediate quality factor, a combination of means and variances of the intermediate quality factor, or a percentile of the intermediate quality factors.

At 108, a candidate allocation policy is selected based on the quality attributes associated with the candidate allocation policies. As the quality attributes calculated at 106 for each candidate allocation policy are comparable with each other, it is possible to determine the best candidate allocation policy. For example, if the quality attributes represent a waiting time, at 108 a candidate allocation policy having the lowest waiting time may be selected.

At 110, the at least one elevator call received at 102 is allocated to an elevator in the elevator group according to the selected candidate allocation policy.

The method illustrated above or steps 104-110 of the method may be repeated, for example, whenever a new elevator call occurs and/or whenever a trigger other than the elevator call is received after the elevator call has originally been received.

In an example embodiment, all the steps 100-110 are performed by an elevator group control controlling a plurality of elevators. In another example embodiment, one or more of the steps 100-110 may be performed by a cloud-based service and remaining one or more of the steps 100-110 may be performed by the elevator group control.

Figure 2:
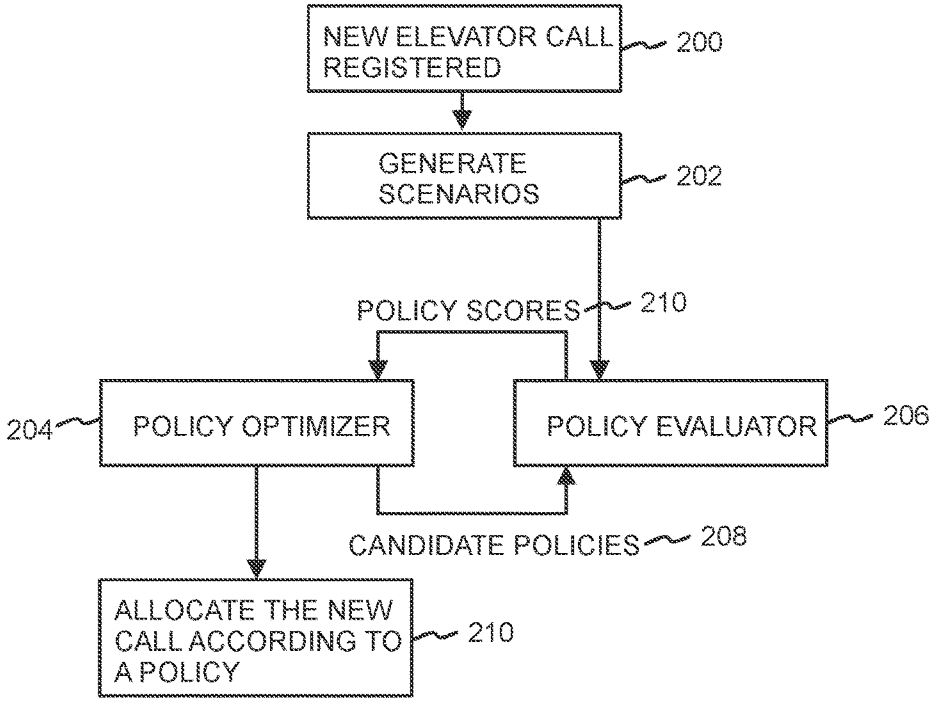
FIG. 2 illustrates a flow chart of a method for elevator call allocations in an elevator group of an elevator system according to another example embodiment.

FIG. 2 illustrates a flow chart of a method for elevator call allocations in an elevator group of an elevator system according to another example embodiment. The method may be used, for example, in an elevator system applying immediate call allocation.

At 200, at least one new elevator call is registered. The call may have been caused, for example, when a passenger uses an up/down button or a destination operating panel (DOP).

At 202 a set of scenarios is generated based on the statistical traffic forecasts for a fixed parameter. In an example embodiment, the fixed parameter may comprise a fixed period of time or a fixed number of passenger arrivals. Further, in an example embodiment, the set of scenarios may be generated by randomly sampling statistical traffic forecasts from the current point onwards. This may include all uncertain information, for example, also batch sizes of existing elevator calls that have not yet been served, for the fixed parameter (for example, two minutes). Each scenario may provide a list of passenger arrivals, where each passenger arrival may comprise an arrival timestamp, an origin floor, a destination floor and a passenger batch size. Each scenario may be valid for the fixed period of time. It is evident that above used two minute example in only one possible example for the fixed period of time, and other values may be used.

A reference 204 refers to a candidate allocation policy optimizer. Each candidate allocation policy may provide a specific way how elevator calls would be allocated. A candidate allocation policy may, for example, allocate calls from a specific floor to a specific elevator, change as a function of time, allocate calls in a specific order to elevators, and/or change an elevator already associated to a floor. In an example embodiment, a candidate allocation policy may remain unchanged when it is applied. In another example embodiment, a candidate allocation policy may change to another candidate allocation policy within the fixed parameter. In another example embodiment, a candidate allocation policy may be a combination of different candidate allocation policies. In an example embodiment, the policy optimizer 204 may evaluate only a subset of all possible candidate allocation policies, and the subset may be chosen during the optimization process. The policy optimizer 204 may use, for example, a genetic algorithm in the optimization process.

The policy optimizer 204 provides the candidate allocation policies 208 to a candidate allocation policy evaluator 206. The candidate allocation policy evaluator 206 evaluates each candidate allocation policy separately in view of the set of scenarios and current elevator call allocation status. When the evaluation is ready, the candidate allocation policy evaluator 206 provides candidate allocation policy scores 210 to the candidate allocation policy optimizer 204. Each score represents a quality of the candidate allocation policy. Depending the type of the score, a lower score value may be better or alternatively a higher score value may be better. As an example, a score may comprise an average value, an average of a non-linear utility function, a combination of mean and variance of the intermediate quality factor, a combination of means and variances of the intermediate quality factor, or a percentile of the intermediate quality factors.

The policy optimizer 204 selects a candidate allocation policy based on the scores associated with the candidate allocation policies, and the at least one new elevator call registered earlier is allocated 210 according to the selected candidate allocation policy.

Figure 3:
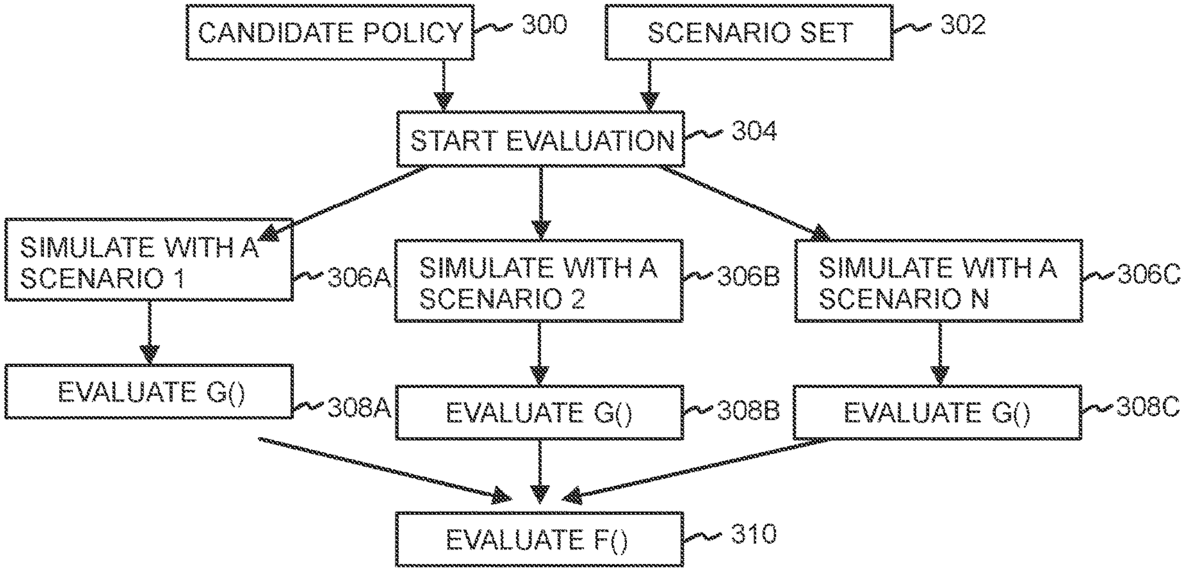
FIG. 3 illustrates a flow chart of a method for evaluating a candidate allocation policy according to an example embodiment.

FIG. 3 illustrates a flow chart of a method for evaluating a candidate allocation policy according to an example embodiment.

A presumption in the example illustrated in FIG. 3 is that a set of scenarios have been generated based, for example, on statistical traffic forecasts for a fixed parameter. In an example embodiment, the fixed parameter may comprise a fixed period of time or a fixed number of passenger arrivals. Further, in an example embodiment, the set of scenarios may be generated by randomly sampling the statistical traffic forecasts from the current point onwards. This may include all uncertain information, for example, also the batch sizes of existing elevator calls that have not yet been served, for the fixed parameter (for example, two minutes). A further presumption is that a set of different candidate allocation policies have been determined. Each candidate allocation policy provides a specific way how elevator calls would be allocated. A candidate allocation policy may, for example, allocate calls from a specific floor to a specific elevator, change as a function of time, allocate calls in a specific order to elevators, and/or change an elevator already associated to a floor.

An evaluation is then started at 304 for a specific candidate allocation policy 300 of the set of candidate allocation policies and the set of scenarios 302. Each scenario is then simulated 306A, 306B, 306C separately in view of the candidate allocation policy 300 and a current elevator call allocation situation in the elevator system. For each scenario, a function g(current call allocation situation, candidate allocation policy, scenario) may be formed, and each of these functions g( ) is evaluated 308A, 308B, 308C separately. Each function g( ) returns an intermediate quality factor or a score for a single scenario of the set of scenarios. In an example embodiment, the intermediate quality factor comprises at least one of an average waiting time, a sum of waiting times, an average time to destination, a sum of times to destination, an energy consumption, a waiting time and time to destination of each passenger, or a proportion of long waiting times.

At 310, a function f(g( )) evaluating the distribution of intermediate quality factors or scores is computed. Thus, f( ) can be written as f(g(current call allocation situation, candidate allocation policy, scenario 1), g(current call allocation situation, candidate allocation policy, scenario 2), . . . g(current call allocation situation, candidate allocation policy, scenario N). The function f( ) takes as inputs the performance indicators (i.e. scores) for each of the 1 . . . N scenarios (as returned by function g) and returns a measure of the overall quality. For example, f( ) may return an average value, an average of a nonlinear utility function, a combination of mean and variance of the intermediate quality factor, or a combination of means and variances of the intermediate quality factor. Depending on the measure, a lower score value of the measure may be better or alternatively a higher score value of the measure may be better.

Figure 4:
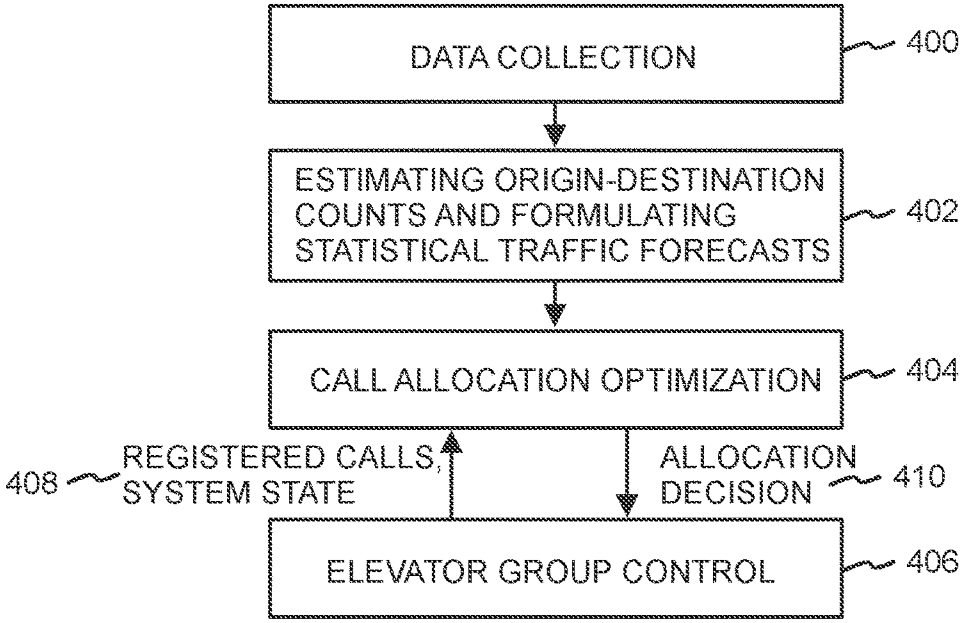
FIG. 4 illustrates a high-level flow chart of optimized call allocation in elevator group control according to an example embodiment.

FIG. 4 illustrates a high-level flow chart of optimized call allocation in elevator group control according to an example embodiment.

At 400, various data is collected. The data may comprise statistical data about historical call allocations, the number of passengers associated with calls etc. The parameters of the processes can be obtained, for example, from historical statistics and recent observations, as indicated by the data collection 400. Alternatively or in addition, sensor information about passengers likely to give calls in the near future may be incorporated into the process.

At 402 origin-destination counts are estimated based on the data collection 400 and statistical traffic forecasts are formulated. In an example embodiment, information tuples of the form (arrival timestamp, origin floor, destination floor, passenger batch size) may be generated. For example, it is possible to use for each origin-destination pair a geometric Poisson process where arrivals follow a Poisson process and the batch sizes have a geometric distribution.

Call allocation optimization 404 has been discussed in more detail in FIGS. 2 and 3 and their description. As discussed there, each candidate allocation policy 300 of a set of candidate allocation policies is analyzed in view of the current call allocation situation and in view of the set of scenarios 302. Thus, the call allocation optimization may take into account also already registered calls and possibly also a system state 408 of the elevator system.

The call allocation optimization 404 returns an allocation decision based on which an elevator group control 406 may allocate an elevator call to an elevator in the elevator group. Although elevator group control 406 has been illustrated with a separate block in FIG. 4, the elevator group control may perform also other steps illustrated in FIG. 4, for example, the call allocation optimization 404.

Figure 5A:
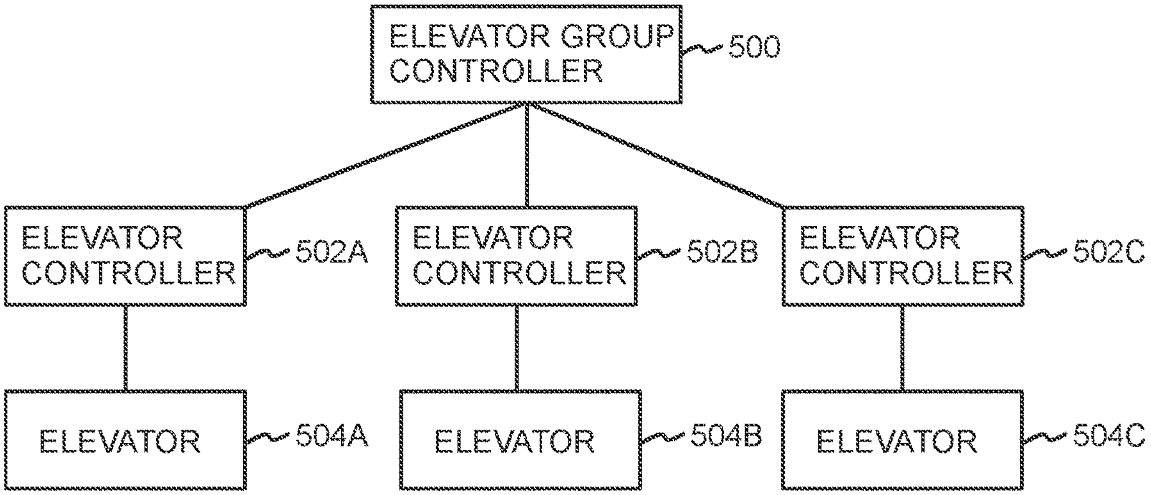
FIG. 5A illustrates a block diagram of an elevator system according to an example embodiment.

FIG. 5A illustrates a block diagram of an elevator system according to an example embodiment. The elevator system comprises a set of elevator 504A, 504B, 504B controlled by respective elevator controllers 502A, 502B, 502C. Each elevator controller 502A, 502B, 502C is connected to an elevator group controller 500.

Figure 5B:
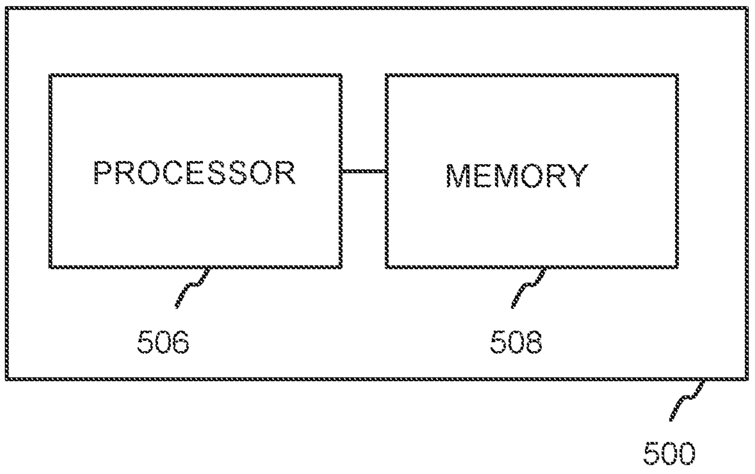
FIG. 5B illustrates a block diagram of an apparatus according to an example embodiment.

FIG. 5B illustrates a block diagram of an apparatus 500 according to an example embodiment.

The apparatus 500 comprises one or more processors 506, and one or more memories 508 that comprise computer program code. The apparatus 500 may also include an input/output module (not shown in FIG. 5B), and/or a communication interface (not shown in FIG. 5B). Although the apparatus 500 is depicted to include only one processor 506, the apparatus 500 may include more than one processor. In an example embodiment, the memory 508 is capable of storing instructions, such as an operating system and/or various applications.

Furthermore, the processor 506 is capable of executing the stored instructions. In an example embodiment, the processor 506 may be embodied as a multi-core processor, a single core processor, or a combination of one or more multi-core processors and one or more single core processors. For example, the processor 506 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 506 may be configured to execute hard-coded functionality. In an example embodiment, the processor 506 is embodied as an executor of software instructions, wherein the instructions may specifically configure the processor 506 to perform the algorithms and/or operations described herein when the instructions are executed.

The memory 508 may be embodied as one or more volatile memory devices, one or more non-volatile memory devices, and/or a combination of one or more volatile memory devices and non-volatile memory devices. For example, the memory 508 may be embodied as semiconductor memories (such as mask ROM, PROM (programmable ROM), EPROM (erasable PROM), flash ROM, RAM (random access memory), etc.).

The apparatus 500 may be a control entity configured to implement only the earlier discussed features in the example embodiments, or it may be part of a larger elevator control entity, for example, an elevator controller or an elevator group controller.

In an embodiment, the at least one memory 508 may store program instructions that, when executed by the at least one processor 506, cause the apparatus 500 to perform at least: applying statistical traffic forecasts modelling future passenger arrivals in the elevator system; receiving an indication of at least one elevator call; generating, for a fixed parameter, a set of scenarios based on the statistical traffic forecasts; determining a quality attribute for each candidate allocation policy of a set of candidate allocation policies by simulating, for each candidate allocation policy, the set of scenarios according to the candidate allocation policy in a current elevator call allocation situation in the elevator system; selecting a candidate allocation policy based on the quality attributes associated with the candidate allocation policies; and allocating the elevator call to an elevator in the elevator group according to the selected candidate allocation policy.

Further, in an embodiment, at least one of the processor 506 and the memory 508 constitute means for applying statistical traffic forecasts modelling future passenger arrivals in the elevator system; receiving an indication of at least one elevator call; generating, for a fixed parameter, a set of scenarios based on the statistical traffic forecasts; determining a quality attribute for each candidate allocation policy of a set of candidate allocation policies by simulating, for each candidate allocation policy, the set of scenarios according to the candidate allocation policy in a current elevator call allocation situation in the elevator system; selecting a candidate allocation policy based on the quality attributes associated with the candidate allocation policies; and allocating the elevator call to an elevator in the elevator group according to the selected candidate allocation policy.

One or more of the above illustrated examples and example embodiments illustrated, for example, in relation to FIGS. 1-5B may provide one or more of the following advantages and/or effects. When optimizing average waiting times, it may be possible to decrease waiting times in various traffic situations compared to myopic optimization where the future is not taken into account. The illustrated solution may also enable incorporation of uncertain information about the future calls (including call times, origin, destination and group sizes) and better approximation for the future states of the system, for example, the future routes of the elevators. Further, the use of a fixed-dimensional policy space may enable a computationally efficient method for evaluating the scenarios with plausible assumptions about how future calls will be allocated. Further, uncertain information about passenger group sizes may be incorporated. Further, applicability to destination control may be provided. Further, the illustrated solution may also enable the possibility to incorporate risk-aversion by using utility functions and decision rules. Further, the illustrated solution may also enable the ability to balance the risk of long waits with optimizing average performance, by introducing nonlinear objective functions (or other decision rules). Further, the illustrated solution may also enable the ability to use objectives that are based on quantiles like 95%. Further, the illustrated solution may also enable the ability to integrate uncertain information from sensors, such as cameras.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

The components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method for elevator call allocations in an elevator group of an elevator system, the method comprising:

applying, by processing circuitry, statistical traffic forecasts modelling future passenger arrivals in the elevator system;

receiving, by the processing circuitry, an indication of at least one elevator call;

generating, by the processing circuitry, for a fixed parameter, a set of scenarios based on the statistical traffic forecasts;

determining, by the processing circuitry, a quality attribute for each candidate allocation policy of a set of candidate allocation policies by simulating, for each candidate allocation policy, the set of scenarios according to the candidate allocation policy in a current elevator call allocation situation in the elevator system;

selecting, by the processing circuitry, a candidate allocation policy based on the quality attributes associated with the candidate allocation policies; and allocating, by the processing circuitry, the at least one elevator call to at least one elevator in the elevator group according to the selected candidate allocation policy and controlling a plurality of elevators in the elevator group, wherein the quality attribute for each candidate allocation policy comprises a combination of mean and variance of an intermediate quality factor, a combination of means and variances of the intermediate quality factor, or a percentile of the intermediate quality factors.

2. The method according to claim 1, further comprising:

determining, based on the simulating, for each candidate allocation policy, the intermediate quality factor for each scenario of the set of scenarios in the current elevator call allocation situation in the elevator system, wherein determining the quality attribute comprises determining the quality attribute for each candidate allocation policy of the set of candidate allocation policies based on the intermediate quality factors associated with each candidate allocation policy.

3. The method according to claim 2, wherein the intermediate quality factor comprises at least one of an average waiting time, a sum of waiting times, an average time to destination, a sum of times to destination, energy consumption, a waiting time and time to destination of each passenger, and proportion of long waiting times.

4. The method according to claim 1, wherein the step of generating, for the fixed parameter, the set of scenarios comprises generating the set of scenarios by randomly sampling the statistical traffic forecasts.

5. The method according to claim 1, wherein a passenger arrival comprises an arrival timestamp, an origin floor, a destination floor and a passenger batch size.

6. The method according to claim 1, wherein the candidate allocation policy comprises at least one of the following:

allocation of calls from a specific floor at a specific time interval to a specific elevator;

change of the candidate allocation policy as a function of time;

allocation of calls to elevators depending on the order in which the calls arrive; and change of an elevator associated to a floor.

7. The method according to claim 1, wherein the elevator system is a destination control system applying immediate call allocation.

8. The method according to claim 1, wherein the fixed parameter comprises a fixed period of time or a fixed number of passenger arrivals.

9. An apparatus for elevator call allocations in an elevator group of an elevator system, the apparatus comprising means configured to perform the method of claim 1.

10. An elevator system comprising the apparatus according to claim 9.

11. A computer program embodied on a non-transitory computer readable medium and comprising instructions which, when the program is executed by a computer, cause the computer to carry out the method of claim 1.

12. A non-transitory computer-readable medium comprising instructions which, when the program is executed by a computer, cause the computer to carry out the method of claim 1.

13. The method according to claim 2, wherein the step of generating, for the fixed parameter, the set of scenarios comprises generating the set of scenarios by randomly sampling the statistical traffic forecasts.

14. The method according to claim 3, wherein the step of generating, for the fixed parameter, the set of scenarios comprises generating the set of scenarios by randomly sampling the statistical traffic forecasts.

15. The method according to claim 1, wherein the step of generating, for the fixed parameter, the set of scenarios comprises generating the set of scenarios by randomly sampling the statistical traffic forecasts.

16. The method according to claim 2, wherein a passenger arrival comprises an arrival timestamp, an origin floor, a destination floor and a passenger batch size.

17. The method according to claim 3, wherein a passenger arrival comprises an arrival timestamp, an origin floor, a destination floor and a passenger batch size.

* * * * *